United States Patent [19]

Ara et al.

[11] Patent Number: 4,783,737
[45] Date of Patent: Nov. 8, 1988

[54] PROM WRITER ADAPTED TO ACCEPT NEW WRITING ALGORITHM

[75] Inventors: Mitsuyuki Ara; Yoshihiro Honma, both of Tokyo, Japan

[73] Assignee: Ando Electric Co., Ltd., Tokyo, Japan

[21] Appl. No.: 928,507

[22] Filed: Nov. 7, 1986

[30] Foreign Application Priority Data

Dec. 25, 1985 [JP] Japan .................. 60-200528[U]

[51] Int. Cl.⁴ .................. G06F 3/00; G06F 7/06; G06F 13/00; G11C 17/00
[52] U.S. Cl. .................. 364/200; 365/94; 364/900
[58] Field of Search .................. 365/94, 189; 364/900, 364/200

[56] References Cited

U.S. PATENT DOCUMENTS 4,638,430 1/1987 Perra et al. .................. 364/900
4,718,038 1/1988 Yoshida .................. 364/900

Primary Examiner—James W. Moffitt
Assistant Examiner—Melissa J. Koval
Attorney, Agent, or Firm—Flynn, Thiel, Boutell & Tanis

[57] ABSTRACT

A PROM writer capable of writing data in a PROM by a writing algorithm other than that stored in the memory thereof without requiring the change of the system program. The PROM writer comprises a first memory storing a system program and a first writing algorithm, a second memory for storing data to be written in a PROM, a CPU which gives a command to write the data stored in the second memory in the PROM according to the system program, a third memory for storing a second writing algorithm, and an interface for storing the second writing algorithm in the third memory. The CPU gives a command to write the data stored in the second memory in the PROM by the second writing algorithm according to the system program.

5 Claims, 1 Drawing Sheet

PROM WRITER ADAPTED TO ACCEPT NEW WRITING ALGORITHM

BACKGROUND OF THE INVENTION

1. Field of the Invention

The present invention relates to a PROM writer for writing data in a PROM and, more specifically, to a PROM writer capable of writing data in a PROM by a writing algorithm other than that stored therein without replacing a memory storing the system program of the PROM with another one in such a case when a new algorithm is provided by a device maker. The writing algorithm referred to herein is a high-speed writing algorithm specific to a specific large-capacity PROM.

2. Description of the Prior Art

A prior art relevant to the present invention is described in a magazine: "Electronics", OHM-sha, Ltd., pp. 945–947, September 1983.

"Quick Program" of Fujitsu Ltd., for example, is constituted so as to operate in the following manner.

(a) Data is written in an address A at a pulse of 1 ms, and then the data written in the address A is read immediately for verification.

(b) The procedure of (a) is repeated twenty times at the maximum until the data is written correctly in the address A.

(c) When the data is written correctly in the address A by the Nth cycle of the data writing procedure, additional data is written in the address A at a pulse of N ms.

(d) The steps (a) to (c) are repeated for all the addresses.

A conventional PROM writer will be described hereinafter with reference to FIG. 2 showing the constitution of the conventional PROM writer.

In FIG. 2, there are shown a CPU 1, memories 2 and 3, a bus 4 and a PROM 5. The CPU 1, the memories 2 and 3 and a bus 4 constitute a conventional PROM writer, which writes data in the PROM 5.

The CPU 1 gives commands through the bus 4 to the memories 2 and 3 and the PROM 5 for write/read control operation. A system program and a first writing algorithm are stored in the memory 2, while data to be written in the PROM 5 is stored in the memory 3.

In operation, the CPU 1 reads the system program and the first writing algorithm stored in the memory 2 through the bus 4 and writes the data stored in the memory 3 in the PROM 5. When the PROM writer of FIG. 2 is required to write data in the PROM 5 by a second writing algorithm different from the first writing algorithm stored in the memory 2 in contents, the system program needs to be replaced with a suitable one. Accordingly, it is impossible to write data simply in the PROM 5 by the second writing algorithm.

SUMMARY OF THE INVENTION

It is an object of the present invention to provide a PROM writer capable of writing data in a PROM by a writing algorithm other than that stored in the memory thereof without requiring the change of the system program.

According to the present invention, a PROM writer is provided with an interface for providing a second writing algorithm different from a first writing algorithm stored in the memory thereof, and a memory for storing the second writing algorithm to write data in the PROM by the second writing algorithm.

The above and other objects, features and advantages of the present invention will become more apparent from the following description when taken in conjunction with the accompanying drawings.

DESCRIPTION OF THE PREFERRED EMBODIMENT

Figure 1:
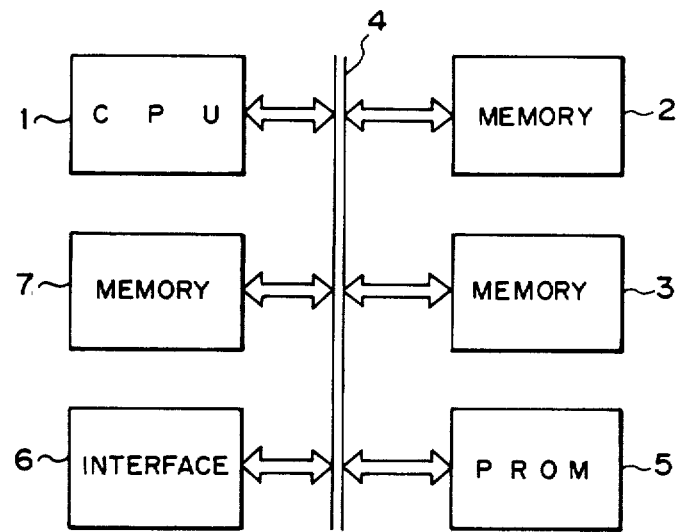
FIG. 1 is a block diagram showing the constitution of a PROM writer, in a preferred embodiment, according to the present invention.
Figure 2:
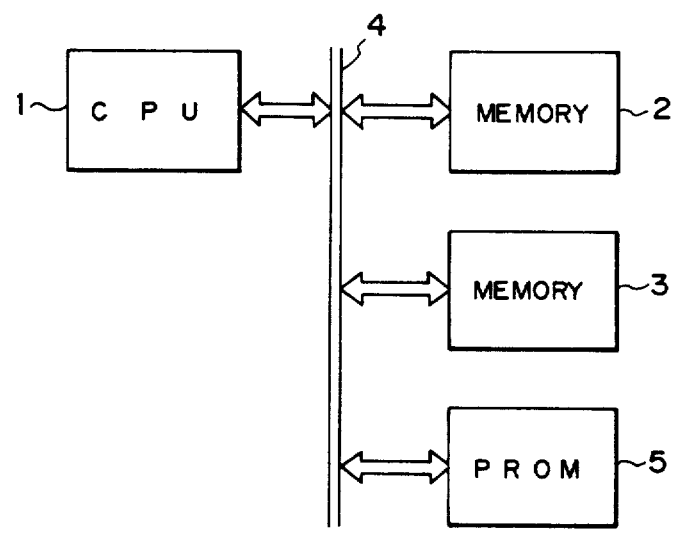
FIG. 2 is a block diagram showing the constitution of a conventional PROM writer.

Referring to FIG. 1, there are shown a CPU 1, memories 2, 3 and 7, a bus 4, a PROM 5 and an interface 6. The CPU 1, the memories 2, 3 and 7, the bus 4 and the interface 6 constitute a PROM writer.

The interface 6 gives a second writing algorithm to the memory 7 and is, for example, a ROM socket for program, a GPIB, a parallel interface, an RS-232C or an IC card. The second writing algorithm is different from the first writing algorithm. The second writing algorithm writes data according to a new algorithm provided by a device maker in the PROM 5. The memory 7 stores the second writing algorithm given to the interface 6.

In operation, the CPU 1 reads through the bus 4 the second writing algorithm given to the interface 6, and then writes the second writing algorithm in the memory 7. Then, the CPU 1 provides a command to write the data stored in the memory 3 in the PROM 5 by the system program stored in the memory 2 and the second writing algorithm stored in the memory 7. Thus, the data is written in the PROM 5 by the second writing algorithm.

In essence, the memories 2, 3 and 7 define an overall memory arrangement having a first portion which includes memory circuit 2 storing the system program and first writing algorithm and memory circuit 3 storing the data to be written in the PROM, and having a second portion which includes memory circuit 7 for storing the second writing algorithm.

Although the invention has been described in its preferred form with a certain degree of particularity, it is to be understood that many changes and variations are possible in the invention without departing from the scope and spirit thereof.

What is claimed is:

1. A PROM writer, comprising:
   (a) first memory means for storing a system program and a first writing algorithm;
   (b) second memory means for storing data to be written into a PROM;
   (c) CPU means operatively coupled to each of the first and second memory means and the PROM for executing the system program, the system program including a command which causes the CPU means to write the data stored in the second memory means into the PROM according to the first writing algorithm;
   (d) third memory means coupled to the CPU means for storing a second writing algorithm; and
   (e) interface means coupled to the CPU means for supplying the second writing algorithm to the CPU means, the system program causing the CPU means to store the second writing algorithm in the third memory means;

wherein the system program includes a command which causes the CPU means to write the data stored in the second memory means into the PROM according to the second writing algorithm.

2. In a PROM writer which includes: a PROM; memory means for storing a system program, a first writing algorithm, and data to be written into said PROM; and processing circuit means coupled to said memory means and said PROM for executing said system program, said system program including a command which causes said processing circuit means to write the data stored in said memory means into said PROM according to said first writing algorithm; the improvement comprising interface means for facilitating the introduction into said PROM writer of a second writing algorithm different from said first writing algorithm, said interface means being opeatively coupled to said processing circuit means; said system program causing said processing circuit means to store said second writing algorithm into said memory means, and including a command which causes said processing circuit means to write the data stored in said memory means into said PROM according to said second writing algorithm.

3. A PROM writer according to claim 2, wherein said memory means includes a first portion and includes a second portion which is a memory circuit physically separate from said first portion; said sytem program, said first writing algorithm and said data being stored in said first portion and said second writing algorithm being stored in said second portion.

4. A PROM writer according to claim 3, wherein said first portion of said memory means includes a first memory circuit which stores said system program and said first writing algorithm and includes a second memory circuit which stores said data.

5. A PROM writer according to claim 2, wherein said processing circuit means includes a central processing unit.

* * * * *